United States Patent
Seo et al.

(10) Patent No.: US 11,134,274 B2
(45) Date of Patent: *Sep. 28, 2021

(54) APPARATUS AND METHOD FOR ENCODING AND DECODING MOVING PICTURE USING ADAPTIVE SCANNING

(71) Applicant: Electronics and Telecommunications Research Institute, Daejeon (KR)

(72) Inventors: Jeong-Il Seo, Daejeon (KR); Wook-Joong Kim, Daejeon (KR); Kyu-Heon Kim, Daejeon (KR); Kyeong-Ok Kang, Daejeon (KR); Jin-Woo Hong, Daejeon (KR); Yung-Lyul Lee, Seoul (KR); Ki-Hun Han, Seoul (KR); Jae-Ho Hur, Paju-si (KR); Dong-Gyu Sim, Seoul (KR); Seoung-Jun Oh, Seongnam-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,384

(22) Filed: Jan. 16, 2020

(65) Prior Publication Data

US 2020/0154142 A1    May 14, 2020

Related U.S. Application Data

(63) Continuation of application No. 16/216,551, filed on Dec. 11, 2018, now Pat. No. 10,575,016, which is a
(Continued)

(30) Foreign Application Priority Data

Oct. 21, 2005    (KR) .................. 10-2005-0099733

(51) Int. Cl.
*H04N 19/61*     (2014.01)
*H04N 19/159*    (2014.01)
(Continued)

(52) U.S. Cl.
CPC .......... *H04N 19/61* (2014.11); *H04N 19/129* (2014.11); *H04N 19/159* (2014.11); *H04N 19/176* (2014.11)

(58) Field of Classification Search
CPC .... H04N 19/61; H04N 19/159; H04N 19/176; H04N 19/129
(Continued)

(56) References Cited

U.S. PATENT DOCUMENTS 5,442,400 A  *  8/1995  Sun ................. H04N 19/00
                                                    348/466
6,148,109 A  *  11/2000 Boon ............... H04N 19/105
                                                    382/238
(Continued)

FOREIGN PATENT DOCUMENTS

EP    0 230 632 A2    8/1987
EP    0 230 632 A3    2/1989
(Continued)

OTHER PUBLICATIONS

A Puri et al., "Improvements in DCT Based Video Coding," Proceedings of SPIE—Visual Communications and Image Processing '97, vol. 3024, Jan. 10, 1997, Part 1, pp. 676-688.
(Continued)

*Primary Examiner* — Kwang B Yao
*Assistant Examiner* — Syed M Bokhari
(74) *Attorney, Agent, or Firm* — Michael Best & Friedrich LLP

(57) ABSTRACT

Provided is an apparatus and method for encoding/decoding a moving picture based on adaptive scanning. The moving
(Continued)

picture apparatus and method can increase a compression rate based on adaptive scanning by performing intra prediction onto blocks of a predetermined size, and scanning coefficients acquired from Discrete Cosine Transform (DCT) of a residue signal and quantization differently according to the intra prediction mode. The moving picture encoding apparatus includes: a mode selector for selecting and outputting a prediction mode; a predictor for predicting pixel values of pixels to be encoded of an input video based on the prediction mode to thereby output a residue signal block; a transform/quantization unit for performing DCT onto the residue signal block and quantizing the transformed residue signal block; and an encoder for adaptively scanning and encoding the quantized residue signal block based on the prediction mode.

11 Claims, 5 Drawing Sheets

Related U.S. Application Data continuation of application No. 15/794,568, filed on Oct. 26, 2017, now Pat. No. 10,187,660, which is a continuation of application No. 14/750,202, filed on Jun. 25, 2015, now Pat. No. 9,838,714, which is a continuation of application No. 13/910,639, filed on Jun. 5, 2013, now Pat. No. 9,118,892, which is a continuation of application No. 13/469,536, filed on May 11, 2012, now Pat. No. 8,520,729, which is a continuation of application No. 12/090,699, filed as application No. PCT/KR2006/004260 on Oct. 19, 2006, now Pat. No. 8,199,819.

(51) Int. Cl.
   *H04N 19/176*   (2014.01)
   *H04N 19/129*   (2014.01)

(58) Field of Classification Search
   USPC .................. 370/546, 240.03; 375/240.24
   See application file for complete search history.

(56) References Cited

U.S. PATENT DOCUMENTS

| | | | |
|---|---|---|---|
| 6,173,080 | B1 | 1/2001 | Cho et al. |
| 6,192,077 | B1 | 2/2001 | Sugiyama |
| 8,199,819 | B2 | 6/2012 | Seo et al. |
| 8,311,119 | B2* | 11/2012 | Srinivasan ............. H04N 19/13 |
| | | | 375/240.18 |
| 8,520,729 | B2 | 8/2013 | Seo et al. |
| 9,118,892 | B2 | 8/2015 | Seo et al. |
| 9,838,714 | B2 | 12/2017 | Seo et al. |
| 2005/0008232 | A1 | 1/2005 | Shen et al. |
| 2005/0068208 | A1 | 3/2005 | Liang et al. |
| 2006/0215919 | A1* | 9/2006 | Srinivasan ............. H04N 19/86 |
| | | | 382/236 |
| 2009/0028239 | A1* | 1/2009 | Schuur ................. H04N 19/136 |
| | | | 375/240.03 |
| 2009/0285302 | A1 | 11/2009 | Kato et al. |
| 2012/0224628 | A1 | 9/2012 | Seo et al. |

FOREIGN PATENT DOCUMENTS

| | | |
|---|---|---|
| EP | 1 465 431 A2 | 10/2004 |
| JP | 2-250581 A | 10/1990 |
| JP | 6-86262 A | 3/1994 |
| JP | 6-125278 A | 5/1994 |
| JP | 6-245200 A | 9/1994 |
| JP | 8-275166 A | 10/1996 |
| JP | 2002-27474 A | 1/2002 |
| JP | 2005-160089 A | 6/2005 |
| JP | 5620641 B2 | 11/2014 |
| KR | 0135364 B1 | 4/1998 |
| KR | 10-0180173 B1 | 5/1999 |
| KR | 10-0234387 B1 | 12/1999 |
| KR | 10-0309165 B1 | 12/2001 |
| KR | 2002-0006149 A | 1/2002 |
| KR | 2002-0081342 A | 10/2002 |
| KR | 2003-0026699 A | 4/2003 |
| KR | 10-2004-0027047 A | 4/2004 |
| WO | 94/15312 A1 | 7/1984 |
| WO | 2007/046644 A1 | 4/2007 |

OTHER PUBLICATIONS

X. Fan et al., "A Novel Coefficient Scanning Scheme for Directional Spatial Prediction-Based Image Compression," Proceedings of the 2003 International Conference on Multimedia and Expo (ICME '03), vol. II, pp. II-557 to II-560, conference held Jul. 6-9, 2003, Baltimore, ISBN 0-7803-7965-9, DOI http://dx.doi.org/10.1109/ICME.2003.1221677.
International Search Report dated Jan. 26, 2007, in counterpart International Application No. PCT/KR2006/004260 (2 pages, in English).
Non-Final Office Action dated Sep. 1, 2011, in great-grandparent U.S. Appl. No. 12/090,699 (without attachments) (23 pages).
Notice of Allowance dated Feb. 16, 2012, in great-grandparent U.S. Appl. No. 12/090,699 (without attachments) (10 pages).
Japanese Office Action dated Dec. 17, 2013, in counterpart Japanese Patent Application No. 2012-270597 (3 pages, in Japanese, no English translation).
European Office Action dated Apr. 7, 2014, in counterpart European Patent Application No. 06799334.5 (6 pages, in English).
Extended European Search Report dated Apr. 17, 2014, in counterpart European Application No. 14152251.6 (9 pages, in English).
Extended European Search Report dated Apr. 17, 2014, in counterpart European Application No. 14152254.0 (9 pages, in English).
Extended European Search Report dated Apr. 17, 2014, in counterpart European Application No. 14152256.5 (8 pages, in English).
Japanese Office Action dated Jan. 6, 2015, in counterpart Japanese Application No. 2014-007967 (4 pages, in Japanese, no English translation).

* cited by examiner

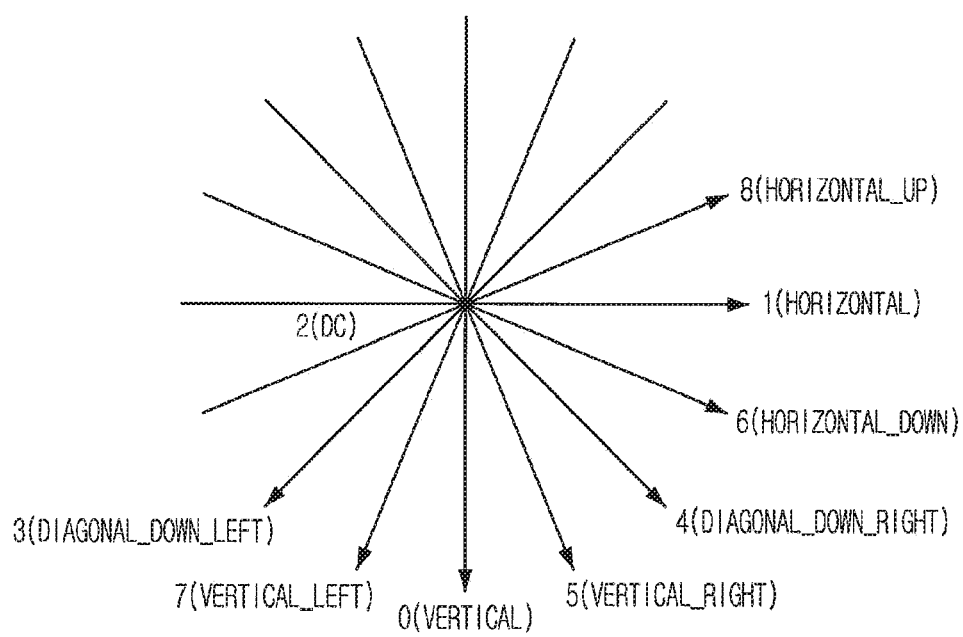

APPARATUS AND METHOD FOR ENCODING AND DECODING MOVING PICTURE USING ADAPTIVE SCANNING

CROSS-REFERENCE TO RELATED APPLICATIONS

This application is a continuation of application Ser. No. 16/216,551 filed on Dec. 11, 2018, which is a continuation of application Ser. No. 15/794,568 filed on Oct. 26, 2017, now U.S. Pat. No. 10,187,660 issued on Jan. 22, 2019, which is a continuation of application Ser. No. 14/750,202 filed on Jun. 25, 2015, now U.S. Pat. No. 9,838,714 issued on Dec. 5, 2017, which is a continuation of application Ser. No. 13/910,639 filed on Jun. 5, 2013, now U.S. Pat. No. 9,118,892 issued on Aug. 25, 2015, which is a continuation of application Ser. No. 13/469,536 filed on May 11, 2012, now U.S. Pat. No. 8,520,729 issued on Aug. 27, 2013, which is a continuation of application Ser. No. 12/090,699 having a 371 (c) date of Apr. 18, 2008, now U.S. Pat. No. 8,199,819 issued on Jun. 12, 2012, which is a U.S. national stage application of International Application No. PCT/KR2006/004260 filed on Oct. 19, 2006, which claims the benefit of Korean Application No. 10-2005-0099733 filed on Oct. 21, 2005, in the Korean Intellectual Property Office, each of which are incorporated herein by reference in their entirety for all purposes.

BACKGROUND

1. Field

The present invention relates to encoding and decoding of a moving picture based on adaptive scanning; and, more particularly, to a moving picture encoding/decoding apparatus that can increase a compression rate by performing intra prediction onto blocks of a predetermined size, and adaptively scanning coefficients acquired from Discrete Cosine Transform (DCT) of a residue signal and quantization differently according to the intra prediction mode, and a method thereof.

2. Description of Related Art

According to an H.264 standard arranged for encoding/decoding a moving picture, the encoding/decoding is performed on the basis of a unit of macro blocks or a unit of a sub-block. One frame includes a plurality of macro blocks, and the sub-block is acquired by dividing a macro block into two or four sub-blocks. The encoding and decoding are carried out based on temporal prediction and spatial prediction. Temporal prediction is predicting motion of the macro blocks of a current frame by referring to macro blocks of adjacent frames. Spatial prediction is predicting a macro block of a current frame to be encoded based on adjacent macro blocks within the current frame.

The spatial prediction is also referred to as intra predication. The intra predication takes advantage of a feature that adjacent pixels of a pixel to be predicted are highly likely to have values similar to a value of the pixel to be predicted. According to the H.264 standard, a pixel value of a current block is predicted based on a prediction mode considering nine directionalities.

FIG. 1 is a view showing an intra prediction mode for 4×4 blocks and 8×8 blocks in the H.264 standard. There are nine prediction modes according to the prediction direction: a vertical mode (mode 0), a horizontal mode (mode 1), a DC mode (mode 2), a Diagonal_Down_Left mode (mode 3), a Diagonal_Down_Right mode (mode 4), a Vertical_Right mode (mode 5), a Horizontal_Down mode (mode 6), a Vertical_Left mode (mode 7), and a Horizontal_Up mode (mode 8). The arrows signify prediction directions. Hereinafter, a prediction process in the vertical mode and the horizontal mode when intra prediction is performed onto 4×4 blocks will be described.

FIG. 2 is a view for describing a pixel prediction process in the vertical mode performed onto 4×4 blocks 300. As shown in FIG. 2, pixels a, e, i, and m 302, 304, 306 and 308 are predicted from an adjacent pixel A in the vertical direction. In the same way, pixels b, f, j and n are predicted from a pixel B, and pixels c, g, k and o are predicted from a pixel C, while pixels d, h, l and p are predicted from a pixel D.

FIG. 3 is a view for describing a pixel prediction process in the horizontal mode performed onto 4×4 blocks 300. As shown in FIG. 3, pixels a, b, c and d 312, 314, 316 and 318 are predicted from an adjacent pixel I in the horizontal direction. In the same way, pixels e, f, g and h are predicted from a pixel J, and pixels i, j, k and l are predicted from a pixel K, while pixels m, n, o and p are predicted from a pixel L.

Meanwhile, a conventional moving picture encoder performs entropy encoding by performing Discrete Cosine Transform (DCT) and quantization onto a residue signal, which is obtained by differentially dividing a predicted signal and a current signal, to thereby produce coefficients and performing zigzag scanning onto the coefficients.

However, the correlation of the residue signal is likely to be high in a horizontal direction or a vertical direction according to whether the prediction mode is a horizontal mode or a vertical mode. Therefore, the conventional encoding method using a fixed zigzag scanning has a drawback that it is not appropriate for acquiring a high compression rate.

SUMMARY

It is, therefore, an object of the present invention to provide a moving picture encoding apparatus and method that can increase a compression rate based on adaptive scanning by performing intra prediction onto blocks of a predetermined size, and adaptively scanning coefficients acquired from Discrete Cosine Transform (DCT) of a residue signal and quantization according to the intra prediction mode, and a decoding apparatus and method therefor.

In accordance with one aspect of the present invention, there is provided an apparatus for encoding a moving picture based on adaptive scanning, which includes: a mode selecting means for selecting and outputting a prediction mode; a predicting means for predicting pixel values of pixels to be encoded of an input video based on the prediction mode to thereby output a residue signal block; a transform/quantization means for performing Discrete Cosine Transform (DCT) onto the residue signal block and quantizing the transformed residue signal block; and an encoding means for adaptively scanning and encoding the quantized residue signal block based on the prediction mode.

In accordance with another aspect of the present invention, there is provided an apparatus for decoding a moving picture based on adaptive scanning, which includes: an entropy decoder for receiving encoded bitstream, decoding the encoded bitstream based on an entropy decoding method, and outputting decoded signals; a scanning method detector for receiving the decoded signals from the entropy decoder, acquiring a scanning method used in the encoding of the decoded signals, and outputting the scanning method information along with the decoded signals; and a video recovering unit for recovering the decoded signals based on the scanning method and outputting a recovered video, wherein the scanning method is an adaptive scanning where different scanning methods are applied based on an intra prediction mode.

In accordance with another aspect of the present invention, there is provided a method for encoding a moving picture based on adaptive scanning, which includes the steps of: a) selecting a prediction mode; b) predicting pixel values of pixels to be encoded of an input video based on the selected prediction mode and outputting a residue signal block; c) performing Discrete Cosine Transform (DCT) onto the residue signal block and quantizing the transformed residue signal block; d) adaptively scanning the quantized residue signal block based on the prediction mode and outputting scanned coefficients; and e) encoding the scanned coefficients.

The present invention can improve an encoding compression rate remarkably by performing intra prediction onto blocks of a predetermined size, and adaptively scanning coefficients acquired from Discrete Cosine Transform (DCT) of a residue signal and quantization differently according to the intra prediction mode, and a method thereof.

BRIEF DESCRIPTION OF THE DRAWINGS

The above and other objects and features of the present invention will become apparent from the following description of the preferred embodiments given in conjunction with the accompanying drawings, in which:

FIG. 1 is a view showing an intra prediction mode for 4×4 blocks and 8×8 blocks in the H.264 standard;

FIG. 2 is a view describing a pixel prediction process in a vertical mode;

DETAILED DESCRIPTION

Figures 3, 4:
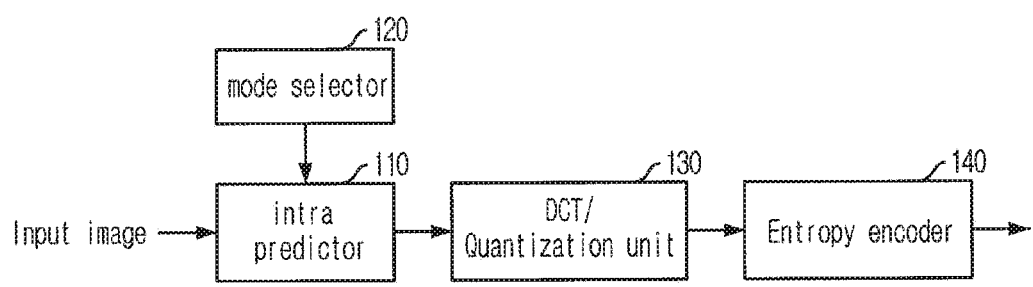
FIG. 3 is a view describing a pixel prediction process in a horizontal mode.
FIG. 4 is a block view illustrating a moving picture encoding apparatus in accordance with an embodiment of the present invention.

The following description exemplifies only the principles of the present invention. Even if they are not described or illustrated clearly in the present specification, one of ordinary skill in the art can embody the principles of the present invention and invent various apparatuses within the concept and scope of the present invention. The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

Other objects and aspects of the invention will become apparent from the following description of the embodiments with reference to the accompanying drawings. When it is thought that a detailed description of a prior art feature may obscure the points of the invention, the description will not be provided herein. Herein, preferred embodiments of the present invention will be described in detail with reference to the accompanying drawings.

FIG. 4 is a block view illustrating a moving picture encoding apparatus in accordance with an embodiment of the present invention.

As shown in FIG. 4, the moving picture encoding apparatus includes an intra predictor 110, a mode selector 120, a Discrete Cosine Transform (DCT)/quantization unit 130, and an entropy encoder 140.

The mode selector 120 selects an optimal prediction mode among the aforementioned intra prediction modes and outputs it to the intra predictor 110. In other words, the mode selector 120 selects one among diverse encoding prediction modes available during 4×4 intra prediction, 16×16 intra prediction and 8×8 intra prediction. Generally, it selects one prediction mode based on rate-distortion optimization.

In case of luminance blocks, the prediction modes include a vertical mode, a horizontal mode, a DC mode, a Diagonal_Down_Left mode, a Diagonal_Down_Right mode, a Vertical_Right mode, a Horizontal_Down mode, a Vertical_Left mode, and a Horizontal_Up mode, which are intra 4×4 luminance encoding modes of the H.264 standard, and a vertical mode, a horizontal mode, a plane mode and a DC mode, which are intra 16×16 luminance encoding modes.

With respect to chrominance blocks, the prediction modes include a vertical mode, a horizontal mode, a plane mode and a DC mode, which are intra M×N chrominance encoding modes of the H.264 standard.

The intra predictor 110 performs prediction on an input image according to the prediction mode inputted from the mode predictor 120 and outputs a residue signal block which represents a difference between the pixel value of a macro block of a current frame to be encoded and a predicted pixel value. In the present embodiment, 4×4 intra prediction is performed onto the pixels of a luminance block, and 8×8 intra prediction is performed onto the pixels of a chrominance block.

The DCT/quantization unit 130 performs DCT and quantization onto the residue signal block inputted from the intra predictor 110 and outputs it to the entropy encoder 140.

The entropy encoder 140 arranges coefficients by adaptively scanning the quantized residue signal block regardless of the kind of the prediction mode, performs entropy encoding, and outputs encoded signals. The entropy encoding is an encoding method which increases the data compression rate by allocating a few bits to data with a high occurrence frequency number and many bits to data with a low occurrence frequency number. The entropy encoding that may be applied to the present invention includes context adaptive variable length coding (CAVLC) and context-based adaptive binary arithmetic coding (CABAC).

Figure 5:
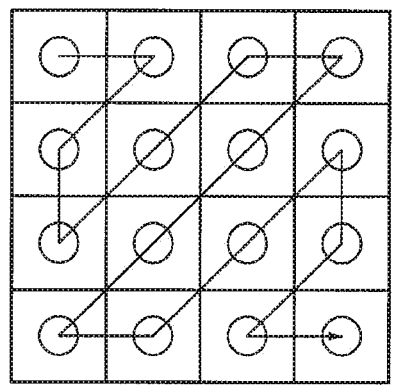
FIG. 5 is a view showing a conventional zigzag scanning.

FIG. 5 is a view describing a conventional zigzag scanning. The conventional zigzag scanning of FIG. 5 is devised in consideration that significant coefficients of the DCT are highly likely to be positioned in the left upper part of the quantized residual signal block. However, when a vertical mode or a horizontal mode is selected as an intra prediction mode, the correlation property of the residue signal may increase in a vertical or a horizontal direction. In the case of the vertical mode, the significant coefficients mainly appear in a first row or so. And, in the case of the horizontal mode, the significant coefficients mainly appear in a first column or so. Therefore, another scanning method that can replace the conventional zigzag scanning is required. Hereinafter, embodiments of adaptive scanning will be described according to the kinds of the intra prediction mode.

Figure 6:
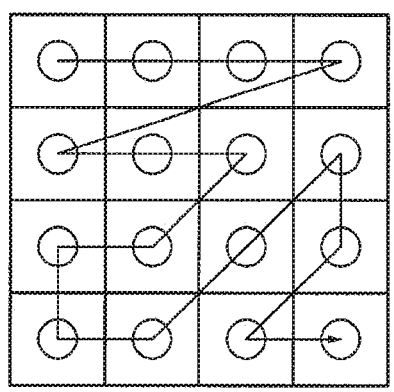
FIG. 6 is a view showing a horizontal preference scanning in accordance with an embodiment of the present invention.
Figure 7:
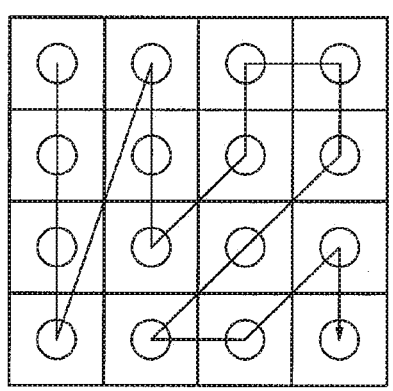
FIG. 7 is a view showing a vertical preference scanning in accordance with an embodiment of the present invention.

FIG. 6 is a view showing a horizontal preference scanning in accordance with an embodiment of the present invention, and FIG. 7 is a view showing a vertical preference scanning in accordance with an embodiment of the present invention.

According to the embodiment of the present invention, the entropy encoder 140 uses the horizontal preference scanning method shown in FIG. 6 when the intra prediction mode is a vertical mode. When the intra prediction mode is a horizontal mode, the entropy encoder 140 uses the vertical preference scanning method shown in FIG. 7. In the other cases, the entropy encoder 140 uses the conventional zigzag scanning, arranges coefficients, performs entropy encoding, and outputs encoded signals.

According to the horizontal preference scanning method illustrated in FIG. 6, all the blocks of the first row are scanned and then the subsequent scanning is performed in a sequence from all the blocks of the first row, followed by the first to third blocks in the second row, the second block and the first block in the third row, the first and second blocks in the fourth row, the third block in the third row, the fourth block in the second row, the fourth block in the third row, and the third and fourth blocks in the fourth row. Therefore, since the horizontal preference scanning of the present invention scans all the blocks in the first row prior to the other rows, it has a high correlation in the row direction and it is appropriate for the vertical mode where the significant coefficients are mainly positioned in the first row or so.

According to the vertical preference scanning described in FIG. 7, scanning is performed in a sequence from all the blocks in the first column first, followed by the first to third blocks in the second column, the second block and the first block in the third column, the first and second blocks in the fourth column, the third block in the third column, the fourth block in the second column, the fourth block in the third column, and the third and fourth blocks in the fourth column.

Therefore, the vertical preference scanning of the present invention has a high correlation in the column direction and it is appropriate for the vertical mode where the significant coefficients are mainly positioned in the first column or so.

Since the present invention determines the scanning method to be applied based on the intra mode, it scarcely affects the existing syntax and the apparatus of the present invention can be realized by applying a little modification to the semantics of a scanning method in the encoding and decoding. Since those skilled in the art of a moving picture encoding/decoding technology such as the H.264 standard can easily realize the adaptive scanning based on an intra prediction mode, which is suggested in the present invention, detailed description on it will not be provided herein.

Figure 8:
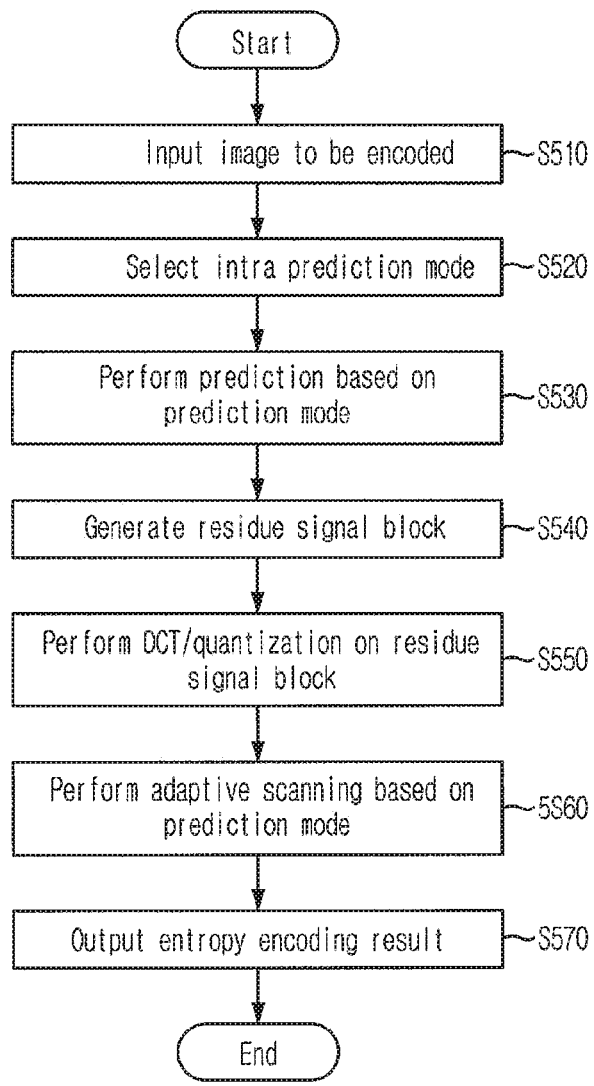
FIG. 8 is a flowchart describing a moving picture encoding method using adaptive scanning in accordance with an embodiment of the present invention.

FIG. 8 is a flowchart describing a moving picture encoding method using adaptive scanning in accordance with an embodiment of the present invention.

First, when an image to be encoded is inputted to the intra predictor 110 at step S510, the mode selector 120 selects an intra prediction mode at step S520.

Subsequently, the intra predictor 110 performs prediction onto the inputted image based on the selected prediction mode at step S530, and creates a residue signal block having a difference value between a pixel value in a macro block of a current frame to be encoded and a predicted pixel value at step S540.

At step S550, the DCT/quantization unit 130 performs DCT onto the residue signal block and quantizes the transformed residue signal block.

Subsequently, the entropy encoder 140 adaptively scans the quantized residue signal block based on the prediction mode at step S560, performs entropy encoding onto the scanned coefficients, and outputs the entropy-encoded coefficients at step S570.

Figure 9:
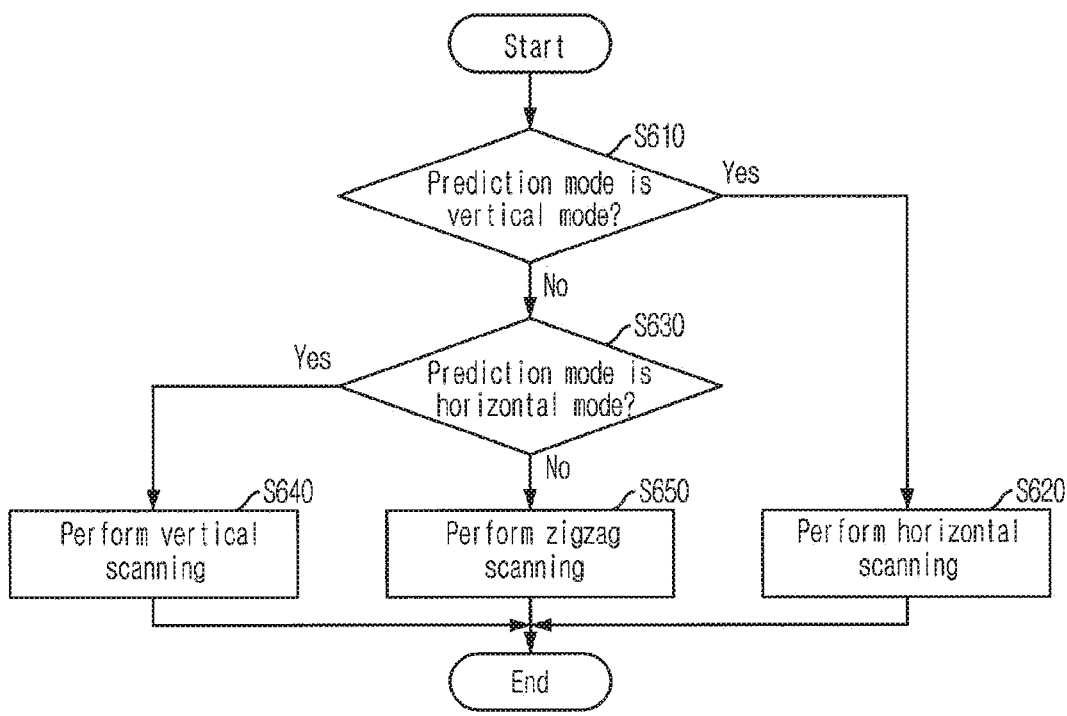
FIG. 9 is a flowchart describing an adaptive scanning in accordance with an embodiment of the present invention.

FIG. 9 is a flowchart describing an adaptive scanning in accordance with an embodiment of the present invention. First, it is determined at step S610 whether the prediction mode is a vertical mode. When it is determined that the prediction mode is the vertical mode, horizontal preference scanning is performed at step S620. Meanwhile, when the prediction mode is not the vertical mode, it is determined at step S630 whether the prediction mode is a horizontal mode.

When the prediction mode is the horizontal mode, vertical preference scanning is carried out at step S640. When it is not the horizontal mode, zigzag scanning is carried out at step S650.

Figure 10:
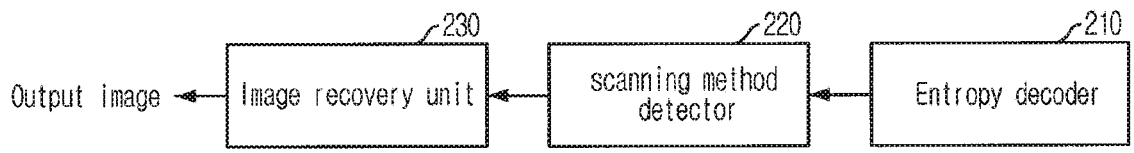
FIG. 10 is a block view illustrating a moving picture decoding apparatus in accordance with an embodiment of the present invention.

FIG. 10 is a block view illustrating a moving picture decoding apparatus in accordance with an embodiment of the present invention.

As illustrated in FIG. 10, the moving picture decoding apparatus of the present invention includes an entropy decoder 210, a scanning method detector 220, and an image recovery unit 230.

The entropy decoder 210 receives an encoded bitstream and decodes it by using an entropy decoding method such as Context Adaptive Variable Length Coding (CAVLC) and Context-based Adaptive Binary Arithmetic Coding (CABAC).

The scanning method detector 220 receives the decoded signal from the entropy decoder 210, acquires information on how the decoded signal was scanned in the encoding process, and transmits the scanning method information to the image recovery unit 230 along with the decoded signal.

The image recovery unit 230 recovers the decoded signal based on the scanning method and outputs a recovered image.

TABLE 1

|  | News (QCIF) | Container (QCIF) | Foreman (QCIF) | Silent (QCIF) | Paris (CIF) | Mobile (CIF) | Tempete (CIF) |
|---|---|---|---|---|---|---|---|
| Entire Frame | 100 (30 Hz) | 100 (30 Hz) | 100 (30 Hz) | 100 (35 Hz) | 100 (30 Hz) | 100 (30 Hz) | 100 (30 Hz) |
| Condition | CABAC, Intra only (Intra 4x4 mode), QP (25, 30, 35, 40) | | | | | | |

As shown in the Table 1, seven images of different sizes were tested.

The following Table 2 compares compression rates, when the test images are encoded based on the encoding method using the adaptive scanning and the conventional encoding method using the H.264 zigzag scanning under the aforementioned experimental conditions.

TABLE 2

| | | JM96 | | Proposed | | Bits |
|---|---|---|---|---|---|---|
| Image | QP | PSNR (dB) | Bits | PSNR (dB) | Bits | Reduction (%) |
| Foreman | 25 | 38.98 | 3341696 | 38.98 | 3321088 | 0.60 |
|  | 30 | 35.21 | 2003064 | 35.21 | 1990384 | 0.55 |
|  | 35 | 31.74 | 1189744 | 31.73 | 1184392 | 0.34 |
|  | 40 | 28.48 | 722416 | 28.48 | 722264 | 0.11 |
| News | 25 | 40.12 | 3448504 | 40.13 | 3381512 | 1.94 |
|  | 30 | 35.95 | 2265968 | 35.96 | 2230296 | 1.57 |
|  | 35 | 31.99 | 1434256 | 31.99 | 1406384 | 1.94 |
|  | 40 | 28.40 | 883904 | 28.42 | 875368 | 0.97 |
| Silent | 25 | 38.97 | 3621240 | 38.97 | 3601360 | 0.55 |
|  | 30 | 34.97 | 2091720 | 34.96 | 2076720 | 0.81 |
|  | 35 | 31.56 | 1182280 | 31.56 | 1180416 | 0.16 |
|  | 40 | 28.46 | 669544 | 28.46 | 672696 | −0.38 |
| Container | 25 | 39.51 | 3287920 | 39.51 | 3260584 | 0.88 |
|  | 30 | 35.68 | 2058192 | 35.69 | 2029224 | 1.44 |
|  | 35 | 32.05 | 1247248 | 32.04 | 1219000 | 2.12 |
|  | 40 | 28.54 | 745848 | 28.54 | 730344 | 2.26 |
| Paris | 25 | 39.21 | 17437120 | 39.20 | 17165032 | 1.56 |
|  | 30 | 34.99 | 11376816 | 34.99 | 11167040 | 1.84 |
|  | 35 | 31.10 | 7078352 | 31.11 | 6950384 | 1.84 |
|  | 40 | 27.50 | 4254824 | 27.52 | 4180808 | 1.61 |
| Mobile | 25 | 38.42 | 27515248 | 38.42 | 27301888 | 0.80 |
|  | 30 | 33.75 | 18700976 | 33.74 | 18538960 | 0.89 |
|  | 35 | 29.45 | 11923256 | 29.44 | 11821040 | 0.89 |
|  | 40 | 25.62 | 7179088 | 25.63 | 7126328 | 0.73 |
| Tempete | 25 | 38.77 | 19968328 | 38.76 | 19748304 | 1.10 |
|  | 30 | 34.33 | 12766256 | 34.33 | 12605288 | 1.25 |
|  | 35 | 30.30 | 7623776 | 30.30 | 7525136 | 1.28 |
|  | 40 | 26.73 | 4278568 | 26.74 | 4244224 | 0.82 |
| Average | 25 |  |  |  |  | 1.06 |
|  | 30 |  |  |  |  | 1.19 |
|  | 35 |  |  |  |  | 1.23 |
|  | 40 |  |  |  |  | 0.88 |

It can be seen from the Table 2 that the encoding compression rate using the adaptive scanning based on the intra prediction mode according to the present invention is superior to the encoding compression rate using the H.264 zigzag scanning.

Meanwhile, a video compression standard to be developed following the H.264 standard is expected to use only the vertical, horizontal, DC, and diagonal prediction modes, because the existing 9-directional intra prediction mode requires a considerable complexity. Therefore, the encoding method using the adaptive scanning of the present embodiment provides even more improvement in the compression rate to thereby save bits about 3%.

Meanwhile, the moving picture encoding/decoding method described above may be authored in the form of a computer program. The codes and code segments that form the program may be easily inferred by computer programmers of the art to which the present invention pertains. Also, the program is stored in a computer-readable recording medium and it can be read and executed by a computer to realize the moving picture encoding/decoding method. The data storage media include magnetic recording media, optical recording media, and carrier wave media.

While the present invention has been described with respect to certain preferred embodiments, it will be apparent to those skilled in the art that various changes and modifications may be made without departing from the scope of the invention as defined in the following claims.

What is claimed is:

1. A method of decoding motion pictures based on adaptive scanning, the method comprising:
    performing entropy decoding of a bitstream to obtain entropy-decoded signals;
    determining an intra prediction mode; and
    reconstructing a block using the entropy-decoded signals and a scanning method determined based on the intra prediction mode,
    wherein the scanning method comprises:
        performing a horizontal scan in response to the intra prediction mode being a vertical intra prediction mode, and
        performing a vertical scan in response to the intra prediction mode being a horizontal intra prediction mode.

2. The method of claim 1, wherein the method further comprises dequantizing and inverse-transforming the entropy-decoded signals after determining the scanning method.

3. The method of claim 1, wherein each of the entropy-decoded signals is a transformed and quantized residue signal representing a difference between a pixel value and a predicted pixel value.

4. The method of claim 1, wherein the intra prediction mode is a mode in accordance with an H.264 standard or a successor standard to the H.264 standard.

5. A method of encoding images, the method comprising:
    generating a prediction block based on an intra prediction mode;
    generating a residue signal block based on the prediction block;
    generating a transformed and quantized residue signal block by transforming and quantizing the residue signal block; and
    performing an adaptive scan on the transformed and quantized residue signal block based on the intra prediction mode,
    wherein the performing of the adaptive scan comprises:
        performing a horizontal scan in response to the intra prediction mode being a vertical intra prediction mode, and
        performing a vertical scan in response to the intra prediction mode being a horizontal intra prediction mode.

6. The method of claim 5, further comprising performing entropy encoding of coefficients of the transformed and quantized residue signal block acquired and arrayed by the adaptive scan performed on the transformed and quantized residue signal block.

7. The method of claim 5, wherein the intra prediction mode is a mode in accordance with an H.264 standard or a successor standard to the H.264 standard.

8. A non-transitory computer-readable medium storing a bitstream which is decoded by a processor of an entropy decoder, the bitstream comprising:

block information; and an intra prediction mode indicator, wherein the block information is used by the entropy decoder to produce entropy-decoded signals for a block, wherein the intra prediction mode indicator is used by the entropy decoder to determine an intra prediction mode for the block, wherein the entropy decoder performs a horizontal scan in response to the intra prediction mode for the block being a vertical intra prediction mode, and wherein the entropy decoder performs a vertical scan in response to the intra prediction mode for the block being a horizontal intra prediction mode.

9. The non-transitory computer-readable medium of claim 8, wherein the entropy-decoded signals are dequantized and inverse-transformed after a scanning method for the entropy-decoded signals is determined.

10. The non-transitory computer-readable medium of claim 8, wherein each of the entropy-decoded signals is a transformed and quantized residue signal representing a difference between a pixel value and a predicted pixel value.

11. The non-transitory computer-readable medium of claim 8, wherein the intra prediction mode is a mode in accordance with an H.264 standard or a successor standard to the H.264 standard.

\* \* \* \* \*